United States Patent [19]

Hirai et al.

[11] Patent Number: 4,674,832
[45] Date of Patent: Jun. 23, 1987

[54] END ASSEMBLY FOR CONNECTION TO END OF GROUND WIRE WITH OPTICAL FIBER

[75] Inventors: Hitoshi Hirai, Tokyo; Yoshikatsu Homma; Tadashi Inoue, both of Funabashi, all of Japan

[73] Assignee: Fujikura Ltd., Tokyo, Japan

[21] Appl. No.: 785,685

[22] Filed: Oct. 9, 1985

[30] Foreign Application Priority Data

Oct. 12, 1984 [JP] Japan .................................. 59-213835
Oct. 29, 1984 [JP] Japan ........................... 59-163386[U]

[51] Int. Cl.[4] ................................................. G02B 6/38
[52] U.S. Cl. ................................ 350/96.21; 174/70 A
[58] Field of Search ............... 350/96.20, 96.21, 96.22, 350/96.23; 174/70 A, 70 R

[56] References Cited

U.S. PATENT DOCUMENTS 4,217,028  8/1980  Reh et al. ....................... 350/96.23 X
4,595,256  6/1986  Guazzo ......................... 350/96.20 X Primary Examiner—Eugene R. Laroche
Assistant Examiner—Steven J. Mottola
Attorney, Agent, or Firm—Armstrong, Nikaido, Marmelstein & Kubovcik

[57] ABSTRACT

An end assembly for connection to a ground wire incorporating an optical fiber cable therein includes a tubular compression sleeve of a plastically deformable material, a protective sleeve received in the compression sleeve and having a bulged portion intermediate opposite ends thereof, and a filler member interposed between the compression sleeve and the protective sleeve. The ground wire comprises a protective tube, an optical fiber cable housed in the protective tube, and a plurality of ground wire elements helically wound around the protective tube. The wire elements are unwound from the protective tube at the end of the ground wire to provide an exposed end portion thereof. The protective sleeve is adapted to be fitted on the exposed end portion of the protective tube with the unwound end portions of the wire elements interposed between the protective sleeve and the filler member. The compression sleeve is compressible to be plastically deformed radially inwardly to firmly hold the unwound wire end portions against an outer peripheral surface of the protective sleeve through said filler member.

11 Claims, 8 Drawing Figures

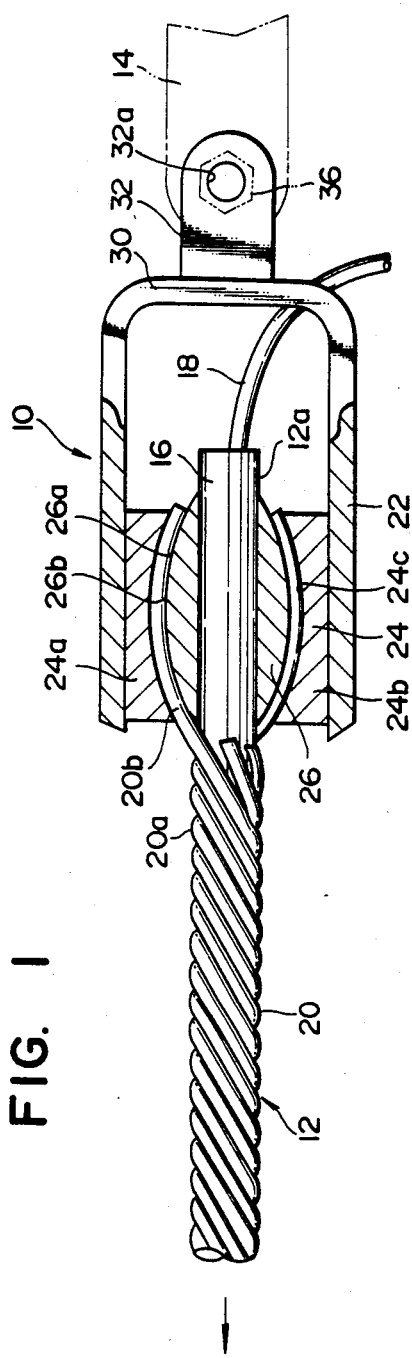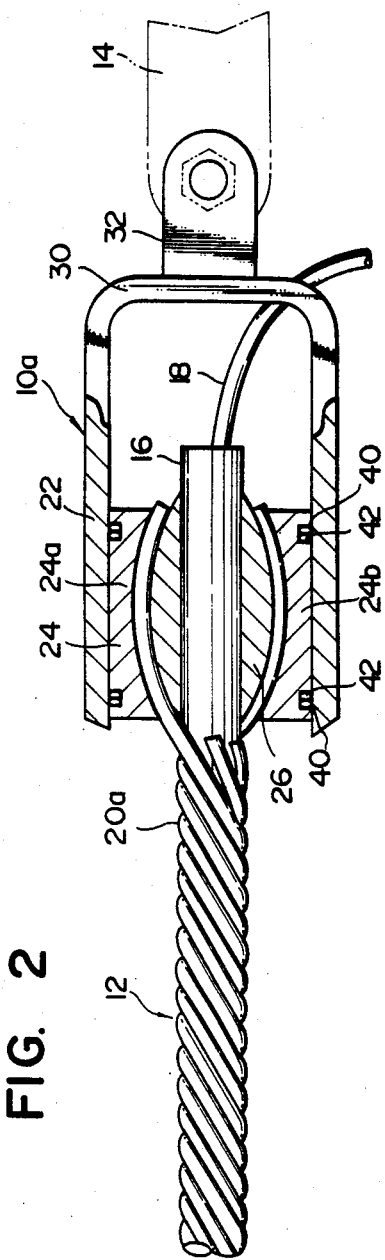

4,674,832

END ASSEMBLY FOR CONNECTION TO END OF GROUND WIRE WITH OPTICAL FIBER

BACKGROUND OF THE INVENTION

1. Field of the Invention

This invention relates to an end assembly for connection to an end of an overhead ground wire incorporating an optical fiber cable therein.

2. Prior Art

An overhead ground wire of the type described comprises a protective tube, an optical fiber cable housed in the protective tube, and a plurality of ground wire elements helically wound around the protective tube to form a wire layer of a hollow configuration. One conventional end member for connection to an end of the ground wire for connecting the ground wire to a support construction such as a pylon and a tower, as disclosed in Japanese Utility Model Application Laid-Open (Kokai) Nos. 56-171523 and 57-15630, comprises a tubular compression sleeve of metal having a uniform inner diameter. For connecting the ground wire to the support construction, the compression sleeve is fitted on the end of the ground wire and is then compressed to be deformed radially inwardly into firm locking engagement therewith. Then, the connecting sleeve is connected to the support construction by a suitable fastening means to hold the ground wire in the air. This conventional end member has been found disadvantageous, however, in that upon compression of the compression sleeve, the protective tube tends to be deformed or crushed to damage the optical fiber cable received therein since the protective tube comprises a relatively thin, soft aluminum tube.

In order to overcome this difficulty, it has been proposed in Japanese Utility Model Application Laid-Open (Kokai) No. 55-181205 and Japanese Utility Model Publication No. 58-54826 to first press-fit a crush-prevention tube of a rigid material, such as steel, in between the wire layer and the protective tube at the end of the ground wire, and to then fit the tubular compression sleeve on the end of ground wire, and to compress the sleeve in a manner described above. With this method, the protective tube is prevented from becoming crushed. The hollow wire layer around the protective tube has a generally uniform outer diameter along its length, and the compression sleeve to be fitted on the wire layer also has a uniform inner diameter along its length. Therefore, it is necessary that the compression sleeve and the crush-prevention tube should be long enough to ensure a sufficient locking engagement of the crushed sleeve with the ground wire. Thus, the compression of the sleeve of such a length requires considerable time and labor. In addition, a great pushing force has to be applied to the crush-prevention tube of such a length to press-fit it in between the the wire layer and the protective tube. Therefore, a special tool is required to push the crush-prevention tube into position.

Another form of the conventional end assembly as disclosed in Japanese Utility Model Application Laid-Open No. 56-166672 serves as a joint between two ground wires and also comprises a compression sleeve to be fitted on one ends of the two ground wire at opposite ends thereof, and a pair of crush-prevention tubes each to be press-fitted in between the wire layer and the protective tube at the end of a respective one of the two ground wires. For effecting the joint, the compression sleeve is compressed at the opposite ends thereof in a manner described above. This conventional end assembly suffers from the same disadvantages as the aforesaid prior art end assemblies suffer.

SUMMARY OF THE INVENTION

It is therefore an object of this invention to provide an end assembly for connection to an end of a ground wire incorporating an optical fiber therein which assembly, upon compression, can be easily brought into firm locking engagement with the ground wire over a relatively short length thereof.

According to the present invention, there is provided an end assembly for connection to an end of an overhead ground wire, the ground wire comprising a protective tube, an optical fiber cable housed in the protective tube, and a plurality of ground wire elements helically wound around the protective tube to form a wire layer of a hollow configuration, the wire elements being unwound from the protective tube at the end of the ground wire to provide an exposed end portion thereof. The end assembly comprises (a) a tubular compression sleeve of a plastically deformable material;

(b) a tubular protective sleeve received in the compression sleeve and having a central bulged portion intermediate opposite ends thereof; and (c) a filler member interposed between the compression sleeve and the protective sleeve;

(d) the protective sleeve is fitted on the exposed end portion of the protective tube with the unwound end portions of the wire elements interposed between the protective sleeve and the filler member, and the compression sleeve is compressible to be plastically deformed radially inwardly to firmly hold the unwound end portions of the wire elements against an outer peripheral surface of the protective sleeve through the filler member.

BRIEF DESCRIPTION OF THE DRAWINGS

FIG. 1 is a cross-sectional view of an end assembly for connection to an end of a ground wire which assembly is provided in accordance with the present invention;

FIGS. 2 and 3 are views similar to FIG. 1 but showing modified end assemblies, respectively;

DESCRIPTION OF THE PREFERRED EMBODIMENTS OF THE INVENTION

Figure 3:
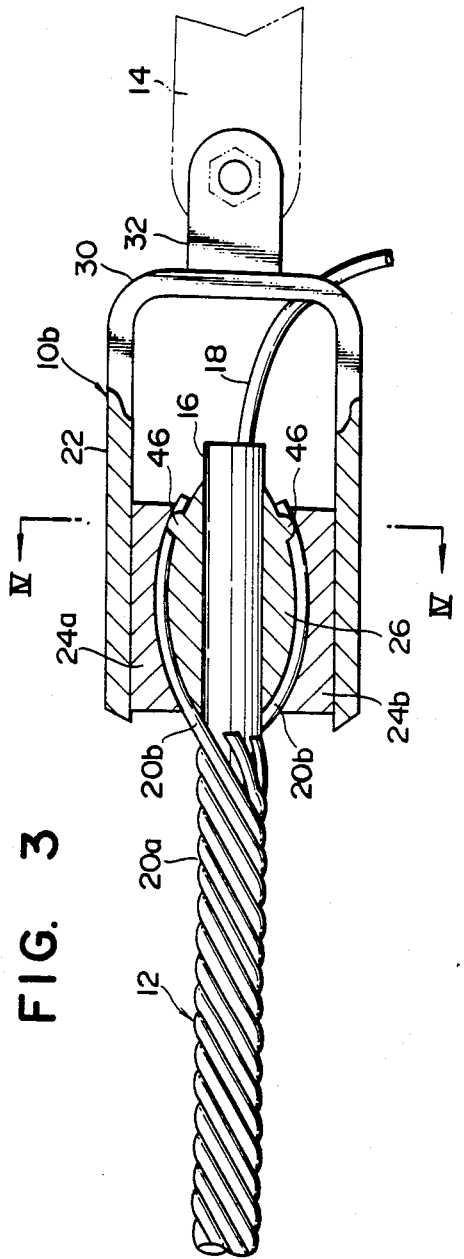

The invention will now be described with reference to the accompanying drawings in which like reference numerals denote corresponding parts in several view.

FIG. 1 shows an end assembly 10 for connection to an end 12a of an overhead ground wire 12 for connecting the end of the ground wire 12 to a support construction 14 such as a pylon and a tower. The overhead ground wire 12 comprises a protective tube 16 made of a suitable material such as aluminum and an aluminum alloy, an optical fiber cable 18 housed in the protective tube 16, and a plurality of ground wire elements 20 helically wound around the protective tube 16 to form a wire layer 20a of a hollow configuration.

The end assembly 10 comprises a tubular compression sleeve 22 of plastically deformable metal such as steel, a tubular filler member 24 of metal such as aluminum snugly received in the compression sleeve 22, and a protective sleeve 26 loosely received in the split collar 24, the protective sleeve 26 being made of metal such as steel harder than the tubular body 22. The protective sleeve 26 is of a tubular shape and is adapted to be fitted on the protective tube 16 of the ground wire 12 at its end 12a. The inner diameter of the protective sleeve 26 is slightly greater than the outer diameter of the protective tube 16. The outer peripheral surface 26a of the protective sleeve 26 is tapering from its center toward opposite ends thereof to provide a central bulged portion 26b.

The filler member comprises a tubular split collar 24 composed of a pair of half cylinders 24a and 24b and having a uniform outer diameter throughout the length thereof. The inner peripheral surface 24c of the split collar 24 is tapering from its center toward opposite ends thereof and corresponds in shape to the tapered outer peripheral surface 26a of the protective sleeve 26. The protective sleeve 26 extends outwardly from the split collar 24 in a direction away from the helically wound wire elements 20.

A U-shaped mounting member 30 is fixedly secured by welding to one end of the compression sleeve 22, and a connective plate 32 having an aperture 32a is fixedly secured by welding to the mounting member 30. The end assembly 10 is connected to the support construction 14 by a bolt 36 passing through the aperture 32a of the connective plate 32 into the support construction 14.

For attaching the end assembly 10 to the ground wire 12, the wire elements 20a are unwound as at 20b from the protective tube 16 at the end 12a of the ground wire 12 to expose the end of the protective tube 16. Then, the protective sleeve 26 is fitted on the exposed end of the protective tube 16 with the unwound end portions 20b of the wire elements 20a held in contact with the outer peripheral surface 26a of the protective sleeve 26. When the end portions 20b of the wire elements 20a are unwound from the end of the protective tube 16, each of the unwound end portions 20b assumes a curve generally corresponding to the outer peripheral surface 26a of the protective sleeve 26 when viewed in a direction transverse to the axis of the protective sleeve 26. Then, the tubular split collar 24 is fitted on the protective sleeve 26 with the unwound wire end portions 20b sandwiched therebetween. Then, the compression sleeve 22 is fitted on the tubular collar 24. Finally, the tubular body 22 is compressed to be deformed radially inwardly, so that the tubular collar 24 is also deformed radially inwardly to firmly hold the unwound wire end portions 20b against the outer peripheral surface 26a of the protective sleeve 26 and the tubular collar 24, thereby connecting the end assembly 10 to the end 12a of the ground wire 12. In this condition, the protective sleeve 26 of a hard metal is not deformed radially inwardly to protect the protective tube 16, which houses the optical fiber cable 18, against crushing.

Since the protective sleeve 26 has the outer peripheral surface 26a tapering from its center toward opposite ends thereof and closely spaced from the correspondingly shaped inner surface of the tubular split collar 24 through the unwound wire end portions 20b, upon application of tension or a pulling force to the ground wire 12 in a direction indicated by an arrow in FIG. 1, the protective sleeve 26 is axially urged toward the split collar 24 in the direction of the arrow, so that the unwound wire end portions 20b are more firmly held therebetween. Therefore, the length of the compression tube 22 to be compressed can be reduced considerably without lowering the ability of the end assembly 10 to hold the ground wire 12.

FIG. 2 shows a modified end assembly 10a which differs from the end assembly 10 of FIG. 1 in that a pair of peripheral grooves 40 and 40 are formed in the outer peripheral surface of the tubular split collar 24 adjacent to the opposite ends thereof and in that a pair of binding wires 42 and 42 are wound around the split collar 24 and received respectively in the pair of grooves 40 and 40 to tie the half cylinders 24a and 24b together. With this construction, the fitting of the compression sleeve 22 on the split collar 24 is facilitated.

Figure 4:
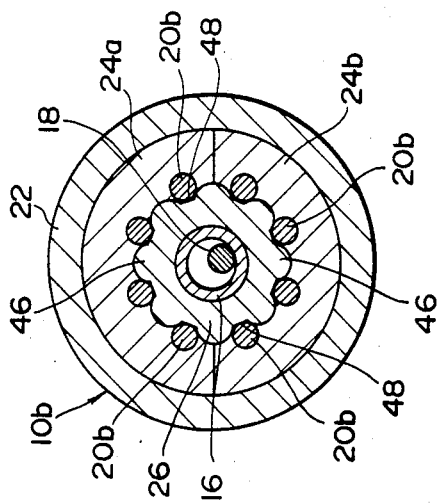
FIG. 4 is a cross-sectional view taken along the line IV—IV of FIG. 3.

FIGS. 3 and 4 show another modified end assembly 10b which differs from the end assembly 10 of FIG. 1 in that the protective sleeve 26 has a plurality of registration projections 46 of a rounded shape formed on the outer peripheral surface 26a adjacent to one end thereof close to the mounting member 30 and spaced circumferentially at equal intervals, the number of the projections 46 corresponding to that of the wire elements 20a. The unwound end portions 20b of the wire elements 20a are received at their free ends respectively in circumferentially spaced recesses 48 defined by the projections 46. By virtue of the provision of the registration projections 46, the unwound wire end portions 20b are uniformly arranged on the protective sleeve 26 and held in position. With this arrangement, upon installation of the ground wire 12 in the air, tension is advantageously exerted on the ground wire 12 along a longitudinal axis thereof.

Figure 5:
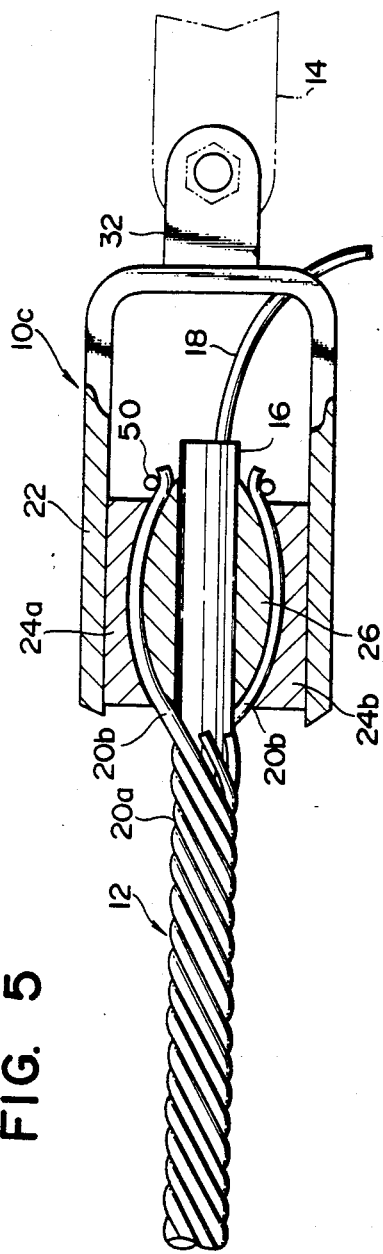
FIGS. 5 to 7 are views similar to FIG. 1 but showing further modified end assemblies, respectively.

FIG. 5 shows a further modified end assembly 10c which differs from the end assembly 10 of FIG. 1 in that a binding wire 50 is wound around the protective sleeve 26 at one end thereof close to the mounting member 30 to hold the unwound wire end portions 20b in equally circumferentially-spaced relation.

Figure 6:
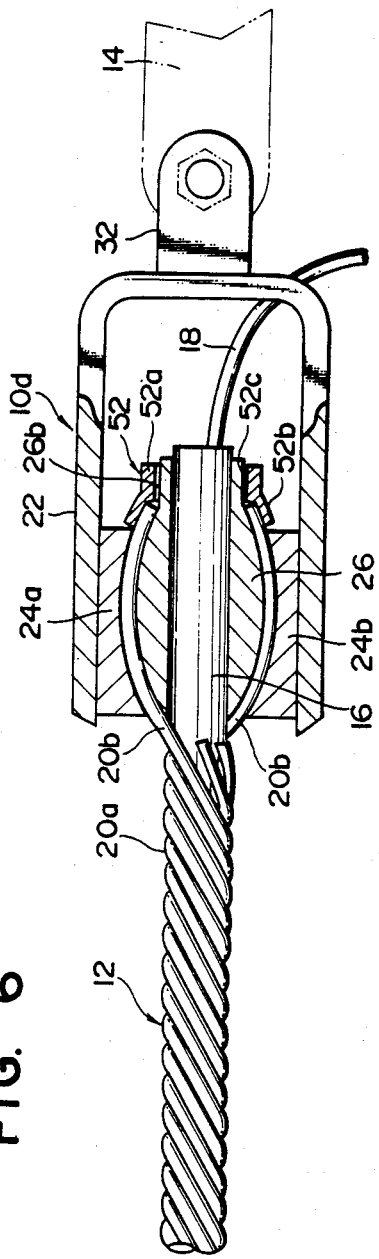

FIG. 6 shows a still further modified end assembly 10d which differs from the end assembly 10 of FIG. 1 in that a retaining ring 52 is provided for threaded engagement with the outer peripheral surface 26 of the protective sleeve 26. The protective sleeve 26 has an externally-threaded portion 26d on the outer peripheral surface 26a at one end thereof close to the mounting member 30. The retaining ring 52 includes an annular body 52a and a flange 52b flaring from one end of the body 52, and the annular body 52a has an internally threaded portion 52c on the inner surface thereof. The retaining ring 52 is fitted on the protective sleeve 26 with the internally-threaded portion 52c threadedly engaging the externally-threaded portion 26d in such a manner that the flaring flange 52b holds the ends of the unwound wire portions 20b against the outer peripheral surface 26a of the protective sleeve 26.

Figure 7:
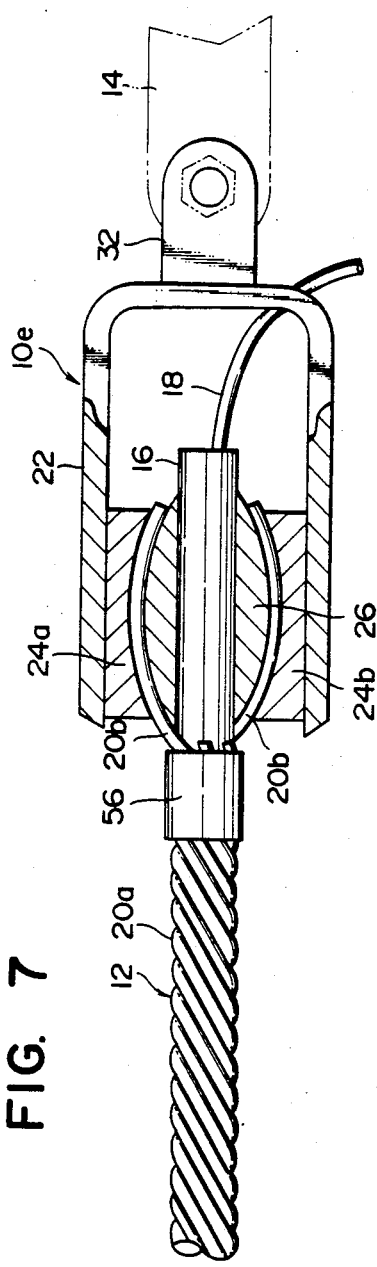

FIG. 7 shows a further modified end assembly 10e which differs from the end assembly 10 of FIG. 1 in that a band 56 is wound around the helically-wound wire elements 20a adjacent to the unwound end portions 20b thereof to prevent the helically-wound wire elements 20a from becoming loose or released.

Figure 8:
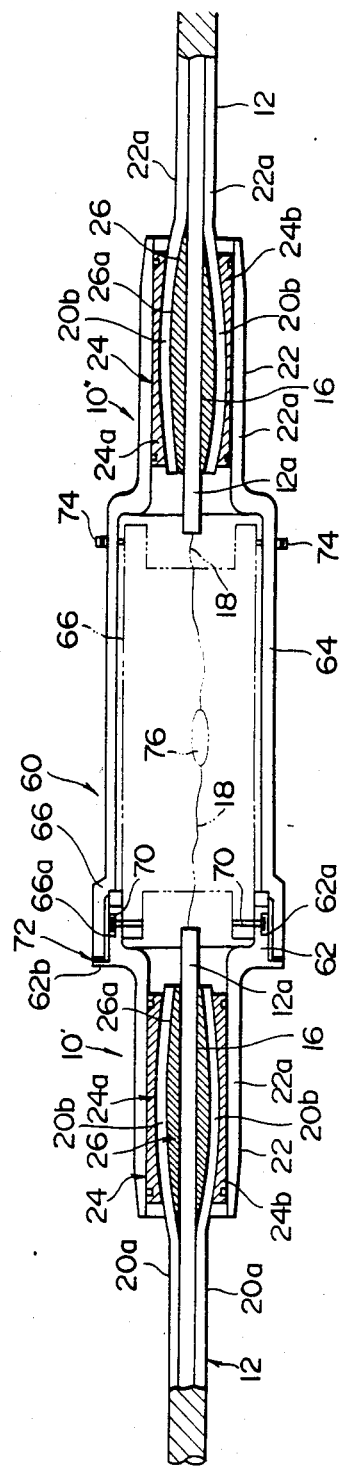
FIG. 8 is a cross-sectional view of a joint assembly for connecting one ends of two ground wires together which assembly is provided in accordance with the present invention.

FIG. 8 shows a joint assembly 60 for connecting one ends 12a and 12a of two ground wires 12 and 12 together. The joint assembly 60 comprises a pair of first and second end assemblies 10' and 10" each similar in construction to the end assembly 10 of FIG. 1. More specifically, the first end assembly 10' comprises a tubular compression sleeve 22 of metal such as steel having a compression portion 22a and a greater diameter portion 62 extending from one end of the compression portion 22a, a tubular filler member or split collar 24 of metal such as aluminum snugly received in the compression portion 22a, and a protective sleeve 26 loosely received in the split collar 24 and adapted to be fitted on the protective tube 16 of the ground wire 12 at its end 12a, the protective sleeve 26 being made of metal such as steel harder than the compression sleeve 22. As described above for the end assembly 10 of FIG. 1, the compression portion 22a is compressed radially inwardly to firmly hold the unwound end portions 20b of the wire elements 20a between the protective sleeve 26 and the split collar 24. The protective tube 16 of the ground wire 12 extends into the greater diameter portion 62 which serves as a connecting portion as described later. The connecting portion 62 has external threads 62a formed on an outer surface thereof.

The second end assembly 10" is identical in construction to the first end assembly 10' except that a greater diameter portion 64 of a compression sleeve 22 is substantially longer than the greater diameter portion 62 to serve as a housing for accommodating an optical fiber cable-joint box 66. The housing 64 has at its free end a further greater diameter portion 66 having internal threads 66a and serving as a connecting portion. The end 12a of the ground wire 12 is secured to the second end assembly 10" in a manner described above for the first end assembly 10'.

The first and second end assemblies 10' and 10" are coupled together by threading the connecting portion 62 into the connecting portion 66. One end of the joint box 66 is received in the connecting portion 62 and secured thereto by bolts 70 passing through the connecting portion 62 into the end of the joint box 66. In this condition, a seal ring 72 made, for example, of chloroprene rubber is interposed between the free end of the connecting portion 66 and a peripheral flange 62b formed on the connecting portion 62 adjacent to the compression portion 22a. A plurality of bolts 74 extend through the housing 64 adjacent to the compression portion 22a in circumferentially spaced relation and are held against the outer surface of the joint box 66 to hold it against movement.

The two optical fiber cables 18 and 18 of the ground wires 12 and 12 held respectively by the first and second end assemblies 10' and 10" extend into the joint box 66 and are joined together at their free ends to provide a joint 76.

Since the compression sleeves 22 and 22 of the first and second end assemblies 10' and 10" are detachably connected together through the above-mentioned threaded engagement, the two ground wires 12 and 12 can be easily disconnected from each other and for connection to another ground wire. In addition, the tension of each of the two ground wires 12 and 12 does not act on the joint 76 between the two optical fiber cables 18 and 18 since the two ground wires are lockingly held by the respective end assemblies 10' and 10". Therefore, transmission characteristics of the optical fibers are not affected for a long period of time.

The greater diameter portions 62 and 64 of the two compression sleeves 22 and 22 may have the same length. Also, the compression sleeve 22 of the second end assembly 10" may be of the same construction as the compression sleeve 22 of the first end assembly 10' in which case a separate tubular housing (not shown) is provided for threaded connection between the two compression sleeves 22 and 22.

What is claimed is:

1. An end assembly for connection to an end of an overhead ground wire, the ground wire comprising a protective tube, an optical fiber cable housed in the protective tube, and a plurality of ground wire elements helically wound around the protective tube to form a wire layer of a hollow configuration, the wire elements being wound from the protective tube at the end of the ground wire to provide an exposed end portion thereof, said end assembly comprising:

a tubular compression sleeve of a plastically deformable material;

a tubular protective sleeve received in said tubular compression sleeve and having an outer peripheral surface with a central bulged portion intermediate opposite ends thereof; and a tubular filler member interposed between said tubular compression sleeve and said tubular protective sleeve, said tubular filler member having an inner peripheral surface which corresponds in shape with said outer peripheral surface of said tubular protective sleeve;

said tubular protective sleeve to be fitted on said exposed end portion of said protective tube with the unwound end portions of said wire elements interposed between said tubular protective sleeve and said tubular filler member, and said tubular compression sleeve being compressible to be plastically deformed radially inwardly to firmly hold said unwound end portions of said wire elements between said outer peripheral surface of said tubular protective sleeve and said inner peripheral surface of said tubular filler member.

2. An end assembly according to claim 1, wherein the outer peripheral surface of said tubular protective sleeve is tapering from its center toward opposite ends thereof, said tubular filler member comprising a tubular split collar composed of a pair of half cylinders of a deformable material and having an inner peripheral surface defining said inner peripheral surface of said tubular filler member and tapering from its center toward opposite ends thereof.

3. An end assembly according to claim 1, in which said tubular compression sleeve includes a connecting means for connection to a support construction.

4. An end assembly according to claim 2, in which said split collar has at least one peripheral groove formed in the outer peripheral surface thereof, a binding wire being wound around said split collar and received in said groove to tie said half cylinders together.

5. An end assembly according to claim 1, in which said tubular protective sleeve has a plurality of registration projections formed on said outer peripheral surface and spaced circumferentially at equal intervals, the number of said projections corresponding to that of said wire elements, said unwound end portions of said wire elements being received respectively in circumferentially-spaced recesses defined by said projections.

6. An end assembly according to claim 1, in which said tubular protective sleeve axially extends outwardly from said tubular filler member in a direction away from said helically wound wire elements, a binding wire being wound around that portion of said protective sleeve extending outwardly of said tubular filler member to hold said tubular unwound end portions of said wire elements.

7. An end assembly according to claim 1, in which said tubular protective sleeve axially extends outwardly from said tubular filler member in a direction away from said helically wound wire elements, a retaining ring being detachably fitted on that portion of said tubular protective sleeve extending outwardly of said tubular filler member to hold said unwound end portions of said wire elements.

8. An end assembly according to claim 1, in which a band is wound around said helically-wound wire elements adjacent to said unwound end portions thereof to prevent said helically-wound wire elements from becoming loose.

9. A joint assembly for connecting one end of two ground wires together, each of the ground wires comprising a protective tube, an optical fiber cable housed in the protective tube, and a plurality of ground wire elements helically wound around the protective tube to form a wire layer of a hollow configuration, the wire elements being unwound from the protective tube at the end of the ground wire to provide an exposed end portion, said joint assembly comprising:

a pair of first and second end assemblies for connection to the one end of the two ground wires, respectively, each of said first and second end assemblies comprising
a tubular compression sleeve of a plastically deformable material;
a tubular protective sleeve received in said tubular compression sleeve and having an outer peripheral surface with a central bulged portion intermediate opposite ends thereof; and
a tubular filler member interposed between said tubular compression sleeve and said tubular protective sleeve, said tubular filler member having an inner peripheral surface which corresponds in shape with said outer peripheral surface of said tubular protective sleeve;
said tubular protective sleeve to be fitted on said exposed end portion of said protective tube of a respective one of said ground wires with the unwound end portions of said wire elements interposed between said tubular protective sleeve and said tubular filler member, said tubular compression sleeve being compressible to be plastically deformed radially inwardly to firmly hold said unwound end portions of said wire elements between said outer peripheral surface of said tubular protective sleeve and said inner peripheral surface of said tubular filler member, and said compression sleeves of said first and second end assemblies being detachably coupled together with the respective optical fiber cables joined together.

10. A joint assembly according to claim 9, wherein the outer peripheral surface of said tubular protective sleeve of each of said first and second end assemblies is tapering from its center toward opposite ends thereof, said tubular filler member of each of said first and second end assemblies comprises a tubular split collar composed of a pair of half cylinders of a deformable material and having an inner peripheral surface defining said inner peripheral surface of said tubular filler member and tapering from its center toward opposite ends thereof.

11. A joint assembly according to claim 9, in which said tubular compression sleeve of each of said first and second end assemblies has a tubular compression portion for receiving said tubular filler member and said tubular protective sleeve and a tubular connecting portion extending from one end of said tubular compression portion, said tubular connecting portions of said first and second end assemblies being detachably coupled together.

* * * * *